United States Patent
Liu et al.

(10) Patent No.: US 12,445,410 B2
(45) Date of Patent: *Oct. 14, 2025

(54) IN-LINE DETECTION OF ALGORITHMICALLY GENERATED DOMAINS

(71) Applicant: Palo Alto Networks, Inc., Santa Clara, CA (US)

(72) Inventors: Daiping Liu, Sunnyvale, CA (US); Martin Walter, Livermore, CA (US); Ben Hua, San Jose, CA (US); Suquan Li, Saratoga, CA (US); Fan Fei, San Jose, CA (US); Seokkyung Chung, Sunnyvale, CA (US); Jun Wang, Fremont, CA (US); Wei Xu, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,311

(22) Filed: Jun. 21, 2023

(65) Prior Publication Data

US 2023/0336524 A1 Oct. 19, 2023

Related U.S. Application Data

(63) Continuation of application No. 16/588,169, filed on Sep. 30, 2019, now Pat. No. 11,729,134.

(51) Int. Cl.
*H04L 61/4511* (2022.01)
*G06F 16/955* (2019.01)
(Continued)

(52) U.S. Cl.
CPC ...... *H04L 61/4511* (2022.05); *G06F 16/9566* (2019.01); *G06F 21/552* (2013.01);
(Continued)

(58) Field of Classification Search
CPC .. G06F 16/9566; G06F 21/552; G06F 21/554; G06F 21/56; G06N 20/00;
(Continued)

(56) References Cited

U.S. PATENT DOCUMENTS 7,467,410 B2 12/2008 Graham
7,934,254 B2 4/2011 Graham
(Continued)

FOREIGN PATENT DOCUMENTS

CN 105577660 3/2019
WO 2007050244 5/2007

OTHER PUBLICATIONS

Van Der Toorn et al., TXTing 101: Finding Security Issues in the Long Tail of DNS TXT Records, 2020 IEEE European Symposium on Security and Privacy Workshops, 2020, pp. 544-549.
(Continued)

*Primary Examiner* — Thomas J Dailey
(74) *Attorney, Agent, or Firm* — Van Pelt, Yi & James LLP

(57) ABSTRACT

Detection of algorithmically generated domains is disclosed. A DNS query is received. Markov Chain analysis is performed on a domain included in the received query. A determination of whether the received query implicates an algorithmically generated domain is made based at least in part on a result of the Markov Chain analysis.

30 Claims, 6 Drawing Sheets

(51) Int. Cl.
- *G06F 21/55* (2013.01)
- *G06F 21/56* (2013.01)
- *G06N 20/00* (2019.01)
- *H04L 9/40* (2022.01)
- *H04L 61/10* (2022.01)
- *H04L 61/3015* (2022.01)
- *H04L 67/02* (2022.01)

(52) U.S. Cl.
CPC ............ *G06F 21/554* (2013.01); *G06F 21/56* (2013.01); *G06N 20/00* (2019.01); *H04L 61/10* (2013.01); *H04L 61/3025* (2013.01); *H04L 63/0236* (2013.01); *H04L 63/029* (2013.01); *H04L 63/1416* (2013.01); *H04L 63/1425* (2013.01); *H04L 63/20* (2013.01); *H04L 63/0209* (2013.01); *H04L 63/145* (2013.01); *H04L 67/02* (2013.01)

(58) Field of Classification Search
CPC . H04L 61/10; H04L 61/3025; H04L 61/4511; H04L 63/0209; H04L 63/0236; H04L 63/029; H04L 63/1416; H04L 63/1425; H04L 63/145; H04L 63/20; H04L 67/02
See application file for complete search history.

(56) References Cited

U.S. PATENT DOCUMENTS

| | | |
|---|---|---|
| 7,958,555 B1 | 6/2011 | Chen |
| 8,141,157 B2 | 3/2012 | Farley |
| 8,260,914 B1 | 9/2012 | Ranjan |
| 8,269,914 B2 | 9/2012 | Huo |
| 8,494,985 B1 | 7/2013 | Keralapura |
| 8,561,177 B1 | 10/2013 | Aziz |
| 8,566,928 B2 | 10/2013 | Dagon |
| 8,631,489 B2 | 1/2014 | Antonakakis |
| 8,826,444 B1 | 9/2014 | Kalle |
| 9,043,894 B1 | 5/2015 | Dennison |
| 9,178,901 B2 | 11/2015 | Xue |
| 9,330,258 B1 | 5/2016 | Satish |
| 9,356,942 B1 | 5/2016 | Joffe |
| 9,363,282 B1 | 6/2016 | Yu |
| 9,497,213 B2 | 11/2016 | Thompson |
| 9,516,039 B1 | 12/2016 | Yen |
| 9,621,576 B1 | 4/2017 | Oprea |
| 9,922,190 B2 | 3/2018 | Antonakakis |
| 10,089,411 B2 | 10/2018 | Kassa |
| 10,097,568 B2 | 10/2018 | Baughman |
| 10,270,744 B2 | 4/2019 | Yu |
| 10,679,088 B1 | 6/2020 | Dalal |
| 10,848,509 B1 | 11/2020 | McNab |
| 11,153,330 B1 | 10/2021 | Antoniewicz |
| 11,159,486 B2 | 10/2021 | Pangeni |
| 2002/0111769 A1 | 8/2002 | Takeuchi |
| 2004/0073640 A1 | 4/2004 | Martin |
| 2006/0212925 A1 | 9/2006 | Shull |
| 2008/0028463 A1 | 1/2008 | Dagon |
| 2008/0155694 A1 | 6/2008 | Kwon |
| 2009/0089426 A1 | 4/2009 | Yamasaki |
| 2010/0192225 A1 | 7/2010 | Ma |
| 2011/0078794 A1 | 3/2011 | Manni |
| 2011/0191423 A1 | 8/2011 | Krasser |
| 2011/0231935 A1 | 9/2011 | Gula |
| 2011/0283359 A1 | 11/2011 | Prince |
| 2011/0283361 A1 | 11/2011 | Perdisci |
| 2012/0054860 A1 | 3/2012 | Wyschogrod |
| 2012/0303808 A1 | 11/2012 | Xie |
| 2012/0304287 A1 | 11/2012 | Yu |
| 2013/0080574 A1 | 3/2013 | Prince |
| 2013/0174253 A1 | 7/2013 | Thomas |
| 2013/0191915 A1 | 7/2013 | Antonakakis |
| 2013/0232574 A1 | 9/2013 | Carothers |
| 2014/0013434 A1 | 1/2014 | Ranum |
| 2014/0068763 A1 | 3/2014 | Ward |
| 2014/0068775 A1 | 3/2014 | Ward |
| 2014/0075558 A1 | 3/2014 | Ward |
| 2014/0090058 A1 | 3/2014 | Ward |
| 2014/0143825 A1 | 5/2014 | Behrendt |
| 2014/0230062 A1 | 8/2014 | Kumaran |
| 2014/0245436 A1 | 8/2014 | Dagon |
| 2014/0283063 A1 | 9/2014 | Thompson |
| 2014/0298460 A1 | 10/2014 | Xue |
| 2015/0007250 A1 | 1/2015 | Dicato, Jr. |
| 2015/0007312 A1 | 1/2015 | Pidathala |
| 2015/0143504 A1 | 5/2015 | Desai |
| 2015/0264070 A1 | 9/2015 | Harlacher |
| 2015/0281257 A1 | 10/2015 | Hart |
| 2016/0036848 A1* | 2/2016 | Reddy ................. H04L 63/0227 726/22 |
| 2016/0065611 A1 | 3/2016 | Fakeri-Tabrizi |
| 2016/0294773 A1 | 10/2016 | Yu |
| 2016/0352679 A1 | 12/2016 | Hagen |
| 2016/0352772 A1 | 12/2016 | O'Connor |
| 2016/0359887 A1 | 12/2016 | Yadav |
| 2017/0126706 A1 | 5/2017 | Minea |
| 2017/0295187 A1 | 10/2017 | Havelka |
| 2017/0331789 A1 | 11/2017 | Kumar |
| 2018/0063162 A1 | 3/2018 | Baughman |
| 2018/0115582 A1 | 4/2018 | Thakar |
| 2018/0124020 A1 | 5/2018 | Rodriguez |
| 2018/0198821 A1 | 7/2018 | Gopalakrishna |
| 2018/0278633 A1 | 9/2018 | Brutzkus |
| 2018/0351972 A1 | 12/2018 | Yu |
| 2020/0059451 A1 | 2/2020 | Huang |
| 2020/0169570 A1 | 5/2020 | Kleymenov |
| 2020/0228500 A1 | 7/2020 | Olumofin |
| 2021/0097168 A1 | 4/2021 | Patel |
| 2021/0126901 A1 | 4/2021 | Rodriguez |
| 2021/0203693 A1 | 7/2021 | Clausen |
| 2021/0400061 A1 | 12/2021 | Antoniewicz |
| 2022/0070194 A1 | 3/2022 | Pon |

OTHER PUBLICATIONS

Alan Shaikh, Botnet Analysis and Detection System, Nov. 2010.
Antonakakis et al., DGAs and Cyber-Criminals: A Case Study, 2012.
Antonakakis et al., From Throw-Away Traffic to Bots: Detecting the Rise of DGA-Based Malware, 21st {USENIX} Security Symposium ({USENIX} Security 12), 2012, pp. 491-506.
Christian Rossow, Thesis, Using Malware Analysis to Evaluate Botnet Resilience, Apr. 23, 2013.
Dietrich et al., On Botnets That Use DNS for Command and Control, 2011 Seventh European Conference on Computer Network Defense, 2011, pp. 9-16.
Gavin E. Crooks, Inequalities Between the Jenson-Shannon and Jeffreys Divergences, 2008.
Greg Farnham et al., Detecting DNS Tunneling, SANS Institute InfoSec Reading Room, accepted on Feb. 25, 2013.
Guy Bruneau, DNS Sinkhole, Aug. 7, 2010, Sans Institute InfoSec Reading Room, pp. 1-41.
Ivan Nikolaev, Network Service Anomaly Detection, Jun. 2014.
Liu et al., CCGA: Clustering and Capturing Group Activities for DGA-Based Botnets Detection, 2019 18th IEEE International Conference on Trust, Security and Privacy in Computing and Communications/ 13th IEEE International Conference on Big Data Science and Engineering, Aug. 5, 2019, pp. 136-143.
Martin Rataj, Simulation of Botnet C&C Channels, 2014.
Mustafa Toprak, Intrusion Detection System Alert Correlation with Operating System Level Logs, Dec. 11, 2009.
Nadler et al., Detection of Malicious and Low Throughput Data Exfiltration Over the DNS Protocol, Jun. 18, 2018.
Palo Alto Networks, We Know it Before You Do: Predicting Malicious Domains, retrieved on Jun. 22, 2015.
Pedro Marques da LUZ, Thesis, Botnet Detection Using Passive DNS, 2013/2014.
Qi et al., A Bigram Based Real Time DNS Tunnel Detection Approach, Procedia Computer Science 17, 2013, pp. 852-860.

(56) References Cited

OTHER PUBLICATIONS

QI et al., BotCensor: Detecting DGA-Based Botnet Using Two-Stage Anomaly Detection, 2018 17th IEEE International Conference on Trust, Security and Privacy in Computing and Communications/ 12th IEEE International Conference on Big Data Science and Engineering, Aug. 1, 2018, pp. 754-762.

Schüppen et al., FANCI: Feature-based Automated NXDomain Classification and Intelligence, Proceedings of the 27th USENIX Security Symposium, Aug. 2018, pp. 1165-1181.

Sebastian Garcia, Identifying, Modeling and Detecting Botnet Behaviors in the Network, Nov. 2014.

Seung Won Shin, Protecting Networked Systems from Malware Threats, Aug. 2013.

Shehar Bano, A Study of Botnets: Systemization of Knowledge and Correlation-based Detection, Oct. 2012.

Vishnu Teja Kilari, Thesis, Detection of Advanced Bots in Smartphones Through User Profiling, Dec. 2013.

Xu et al., We Know it Before You Do: Predicting Malicious Domains, Virus Bulletin Conference Sep. 2014.

Xu et al., We Know it Before You Do: Predicting Malicious Domains, Sep. 2014.

Qi et al., BotCensor: Detecting DGA-Based Botnet Using Two-Stage Anomaly Detection, 2018 17th IEEE International Conference On Trust, Security And Privacy In Computing And Communications/12th IEEE International Conference On Big Data Science And Engineering, pp. 754-762.

\* cited by examiner

IN-LINE DETECTION OF ALGORITHMICALLY GENERATED DOMAINS

CROSS REFERENCE TO OTHER APPLICATIONS

This application is a continuation of U.S. patent application Ser. No. 16/588,169 entitled IN-LINE DETECTION OF ALGORITHMICALLY GENERATED DOMAINS filed Sep. 30, 2019 which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

Figure 1:
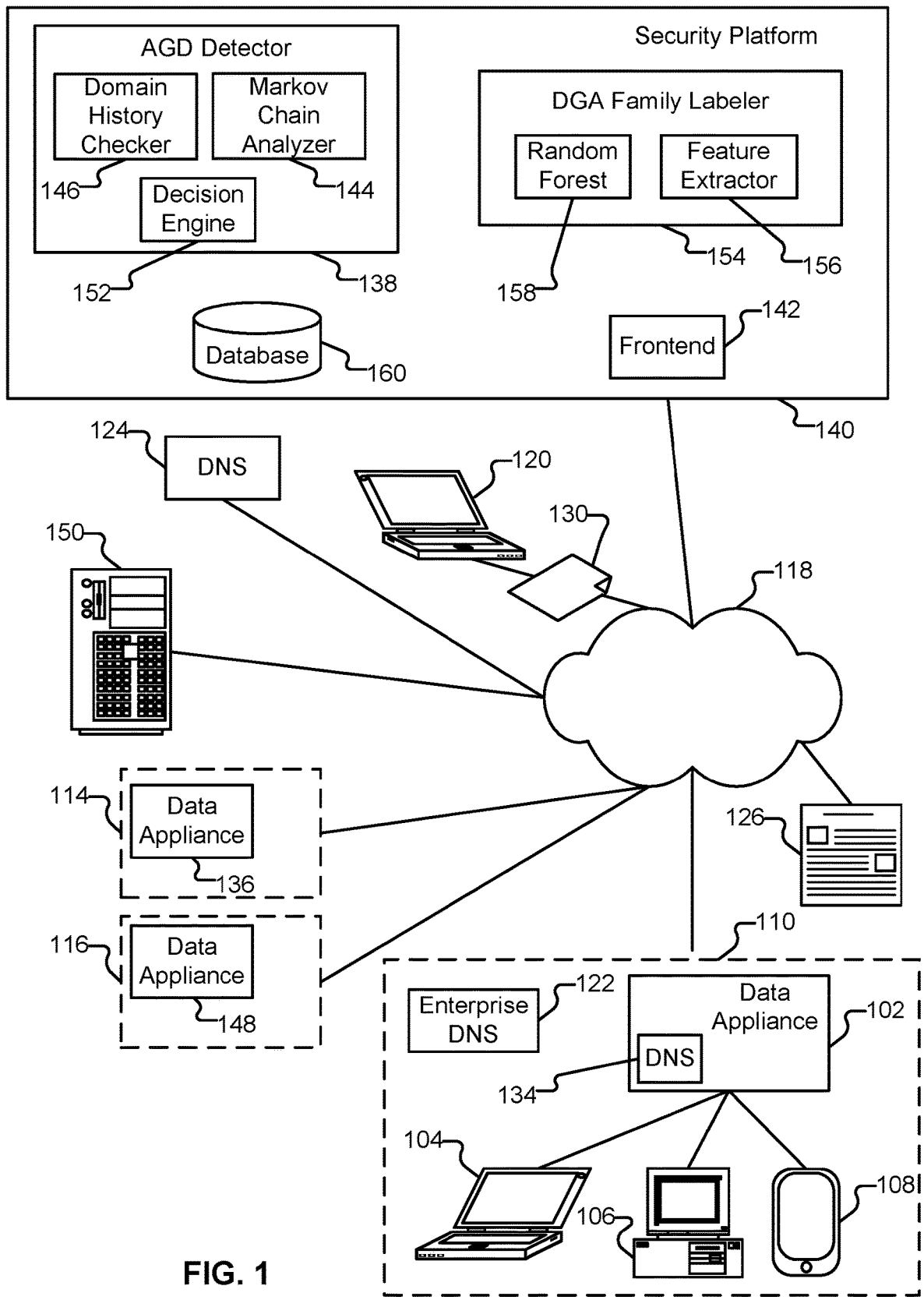
FIG. 1 illustrates an example of an environment in which malware is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Over View

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets-using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malware is detected and its harm reduced. In the example shown, client devices 104-108 are a laptop computer, a desktop computer, and a tablet (respectively) present in an enterprise network 110 (belonging to the "Acme Company"). Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 110.

Data appliance 102 can be configured to work in cooperation with a remote security platform 150. Security platform 150 can provide a variety of services, including performing static and dynamic analysis on malware samples, and providing a list of signatures of known-malicious files to data appliances, such as data appliance 102 as part of a subscription.

Figure 2A:
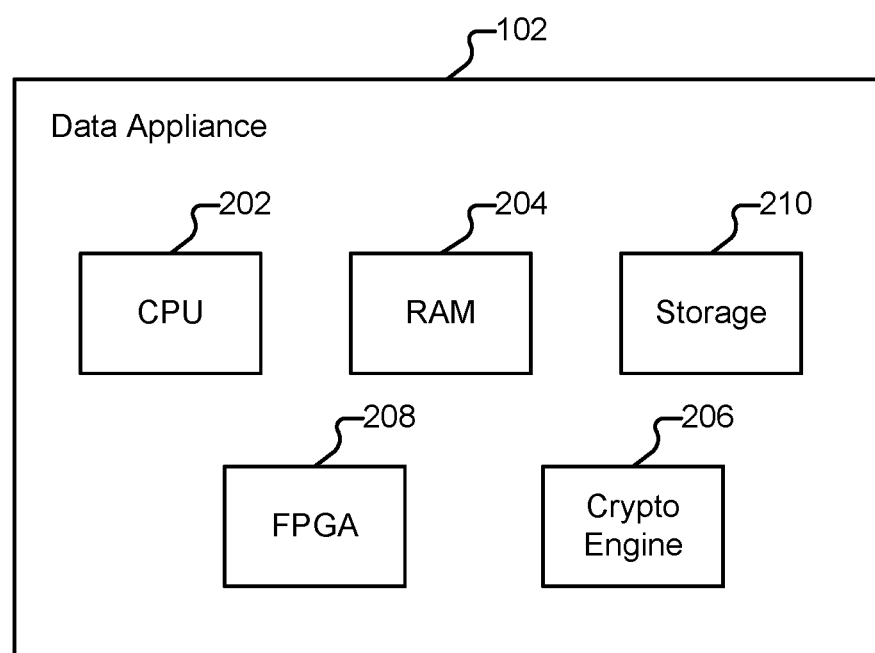
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
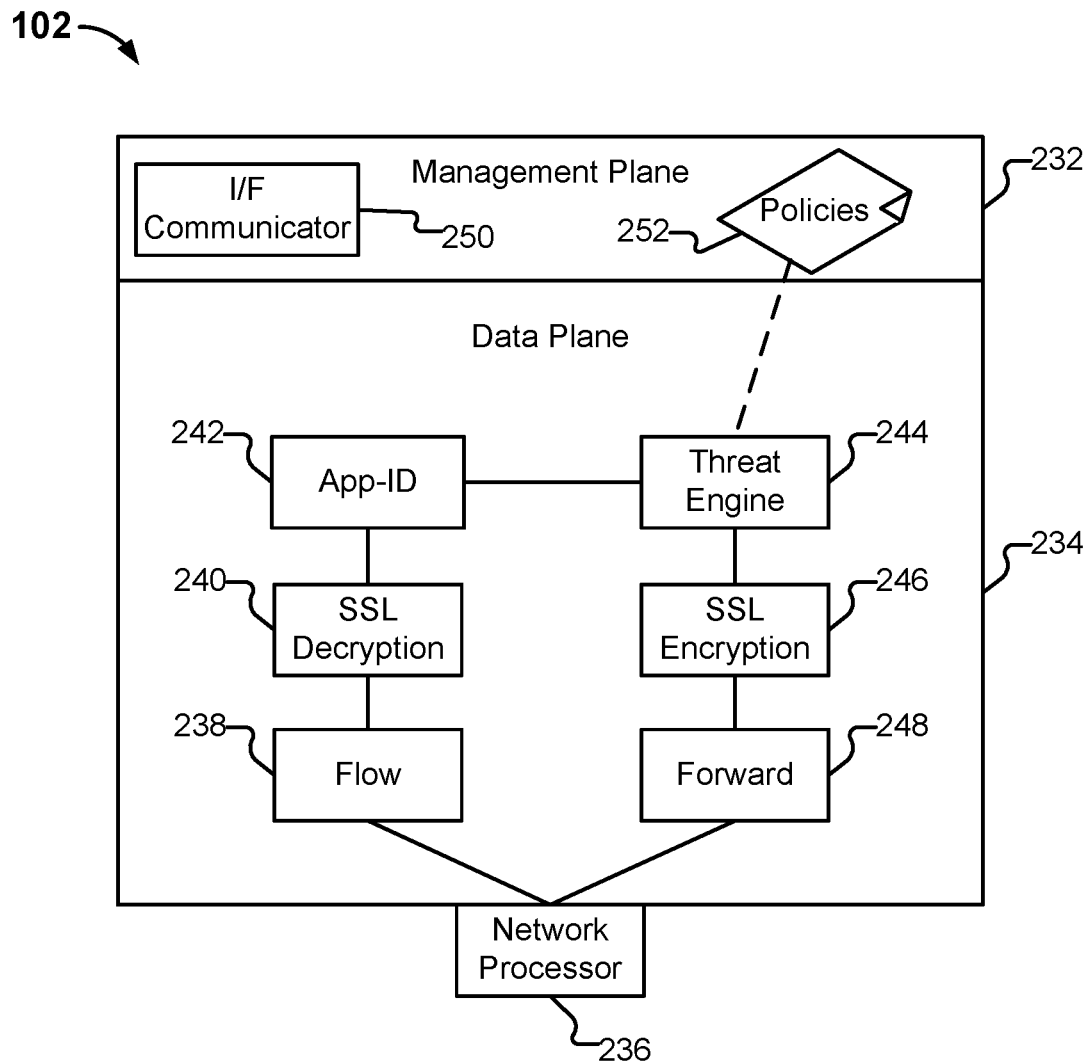
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Algorithmically Generated Domains

Returning to FIG. 1, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose C&C server 150 is reachable by the domain "kjh2398sdfj.com," which the malware author registered on a Monday morning (e.g., at 00:01) using a stolen identity/credit card information. While malware 130 could explicitly include the domain "kjh2398sdfj.com" in its code, techniques such as static/dynamic analysis of malware 130 (e.g., as performed by security platform 140) could make it possible for a security company (or other applicable entity, such as a security researcher) to identify the domain "kjh2398sdfj.com" as associated with a C&C server, and take remedial actions (e.g., publish the domain "kjh2398sdfj.com" on a blacklist, and/or act to get the C&C server shut down/made unreachable). Further, if the domain "kjh2398sdfj.com" is hard coded into malware 130, once C&C server 150 is shut down, the malware author will potentially be unable to switch the command and control server used by malware 130 (e.g., switch the malware from contacting "kjh2398sdfj.com" to another, still reachable domain)—making the malware less useful to the malware author.

Instead of hard coding the domain "kjh2398sdfj.com" into malware 130, another approach is for the malware author to make use of algorithmically generated domains ("AGDs"). With AGDs, instead of trying to contact a specific, predetermined domain, malware 130 can programmatically generate multiple domain names and try to connect to each generated name in turn, until a successful connection is made. Further, the malware can continue to generate domain names, so that in the event "kjh2398sdfj.com" becomes no longer reachable, the malware can successfully contact the C&C server at a new domain.

In the following example, suppose malware 130 uses client device 104's system clock time as a seed, generates an ASCII string every five minutes, and then attempts to connect to the generated string (after adding an appropriate top level domain to the string, such as .com, as applicable). Malware 130 (e.g., when executing on a client device, such as client device 104) first generates "dwk2648vkwh.com" and attempts to connect to it Monday morning at 0:00. Since the malware author did not register "dwk2648vkwh.com" (and C&C server 150 is not reachable via "dwk2648vkwh.com"), no connection will be made to C&C server 150 by client device 104 via "dwk2648vkwh.com." At the next five minute mark, malware 130 (e.g., when executing on client device 104) will generate the domain "gwd4734qj5i.com" and attempt to connect to that domain (e.g., at 0:05). Malware 130 will continue generating domain names every five minutes (and attempting to connect to those domain names) until (e.g., at 1:15) it generates and is able to connect to "kjh2398sdfj.com" (which the malware author registered and brought online at 0:01 Monday).

Typically, a malware author will use a first domain (e.g., "kjh2398sdfj.com") for a period of time, such as two or three days (or a week), and then periodically switch the C&C server (or bring up other C&C servers, as applicable) to a new domain (e.g., "43hfd83hd3.com") to thwart efforts to shut the C&C server down/block access to the C&C server. The malware's domain generation algorithm will correspondingly generate the appropriate new, reachable, C&C domains (e.g., "43hfd83hd3.com") as well as other domains (e.g., every five minutes) that the author will not register-rotating through domain names the malware will use to successfully reach an appropriate C&C server. Since the author of malware 130 selected the domain generation algorithm (DGA) used by malware 130, the malware author is able to programmatically determine which domains will be generated by compromised machines (and at what date/time malware copies will attempt to communicate with those generated domains), and can therefore register a single appropriate domain for C&C use for a given time period. Typically, the malware author will register a new domain just before the domain is needed (e.g., within hours of when clients executing the domain generation algorithm would potentially start trying to connect to "43hfd83hd3.com").

The AGDs generated by malware 130 appear (e.g., to a researcher or other observer) seemingly random, and as such are problematic for security companies, particularly where a large number of domains are generated within a short period of time by the malware. If a security company is able to determine how the AGDs are generated by a particular piece of malware, the security company could potentially take remedial actions with respect to those domains. Unfortunately, malware authors typically obfuscate their domain generation algorithms, and do so at a level of sophistication that makes reverse engineering the malware (and domain generation algorithm) in a timely manner difficult, if not impossible. For example, a talented security researcher may need to expend months of effort to reverse engineer a single domain generation algorithm. In contrast, malware authors can modify the workings of their domain generation algorithms with relative ease/speed (e.g., changing the algorithm each week). By the time the researcher has discovered how the domain generation algorithm works, the malware author can easily have switched to a new algorithm, meaning the researcher will likely have to start analysis of the new algorithm from scratch-again taking potentially months to discover how the new algorithm works. As will be described in more detail below, using techniques described herein, attempts to contact AGDs (e.g., by a compromised client device 104) can be efficiently detected, and a variety of remedial actions taken in response to their detection, without requiring a researcher to determine (e.g., via reverse engineering) how the algorithm used to generate the AGDs works.

A. DNS Resolution

The environment shown in FIG. 1 includes two Domain Name System (DNS) servers (122 and 124). As shown, DNS server 122 is under the control of ACME (for use by computing assets located within network 110), while DNS server 124 is publicly accessible (and can also be used by computing assets located within network 110 as well as other devices, such those located within other networks (e.g., networks 114 and 116). Enterprise DNS server 122 is configured to resolve enterprise domain names into IP addresses, and is further configured to communicate with one or more external DNS servers (e.g., DNS server 124) to resolve domain names as applicable.

In order to connect to a website 126 (e.g., www.example.com), a client device, such as client 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client 104 can connect to website 126 using the IP address. Similarly, in order to connect to malicious C&C server 150, client device 104 will need to resolve the domain, "kjh2398sdfj.com," to a corresponding Internet Protocol (IP) address.

In various embodiments, data appliance 102 includes a DNS module 134, which is configured to facilitate determining whether client devices (e.g., client devices 104-108) are attempting to contact AGDs, and/or prevent connections (e.g., by client devices 104-108) to AGDs. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or security platform 140), and can also be provided by a third party (e.g., one that is different from the provider of appliance 102 or security platform 140). Further, in addition to preventing connections to known/suspected AGDs, DNS module 134 can take other actions, such as logging attempts by clients to access AGDs (an indication that a given client is compromised and should be quarantined, or otherwise investigated by an administrator).

In various embodiments, when a client device (e.g., client 104) attempts to resolve a domain, DNS module uses the domain as a query to security platform 140. This query can be performed concurrently with resolution of the domain (e.g., with the request sent to DNS servers 122 and/or 124, as well as security platform 140). As one example, DNS module 134 can send a query (e.g., in the JSON format) to a frontend 142 of security platform 140 via a REST API. Using processing described in more detail below, security platform 140 will determine (e.g., using AGD detector 138) whether the queried domain is an AGD and provide a result back to DNS module 134 (e.g., "non-AGD" or "AGD").

B. Differences Between Benign Domains and AGDs

AGDs will typically have different character distribution probabilities from benign domains. Often, benign domains will comprise actual words, or at least contain pronounceable groupings of characters (e.g., "wikipedia.org" and "amazon.com"). In contrast, AGDs will typically comprise random characters (e.g., "zkkfpkbbmihohix.com"). One approach to determining whether a domain is algorithmically generated is to evaluate its characters. In various embodiments, security platform 140 includes a Markov Chain analyzer 144 configured to evaluate the likelihood a given domain is an AGD.

Figure 3:
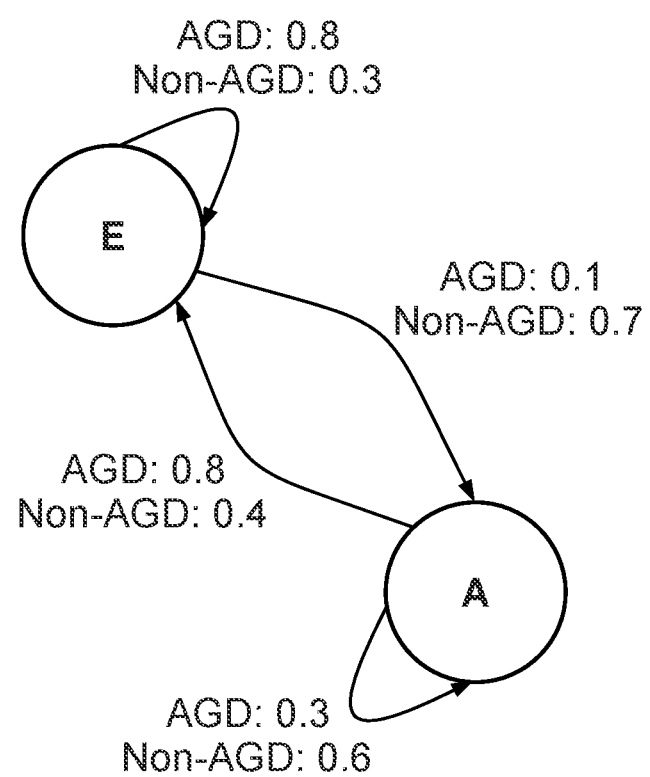
FIG. 3 depicts a visual representation of portion of an example Markov Chain model.

A visual representation of portion of an example Markov Chain model is depicted in FIG. 3. In particular, it depicts the respective probabilities of transitions involving "ee," "ea," "ae," and "aa" for both AGDs and a benign domains. Such a Markov Chain model can be generated from training data comprising known benign domains and known AGDs. A score (e.g., −0.35) can be calculated for a given domain using the Markov Chain model, and a threshold applied (e.g., −0.44 or below) to assign a verdict of "benign" or "AGD" to the domain.

AGD analysis using a Markov Chain is fast enough that security platform 140 can provide realtime results to data appliance 102. Unfortunately, Markov Chain analysis can also result in false positives. As one example, a domain such as "exampleeee.com" which might in fact be a benign domain, might erroneously be flagged as an AGD using Markov Chain analysis.

Figure 4A:
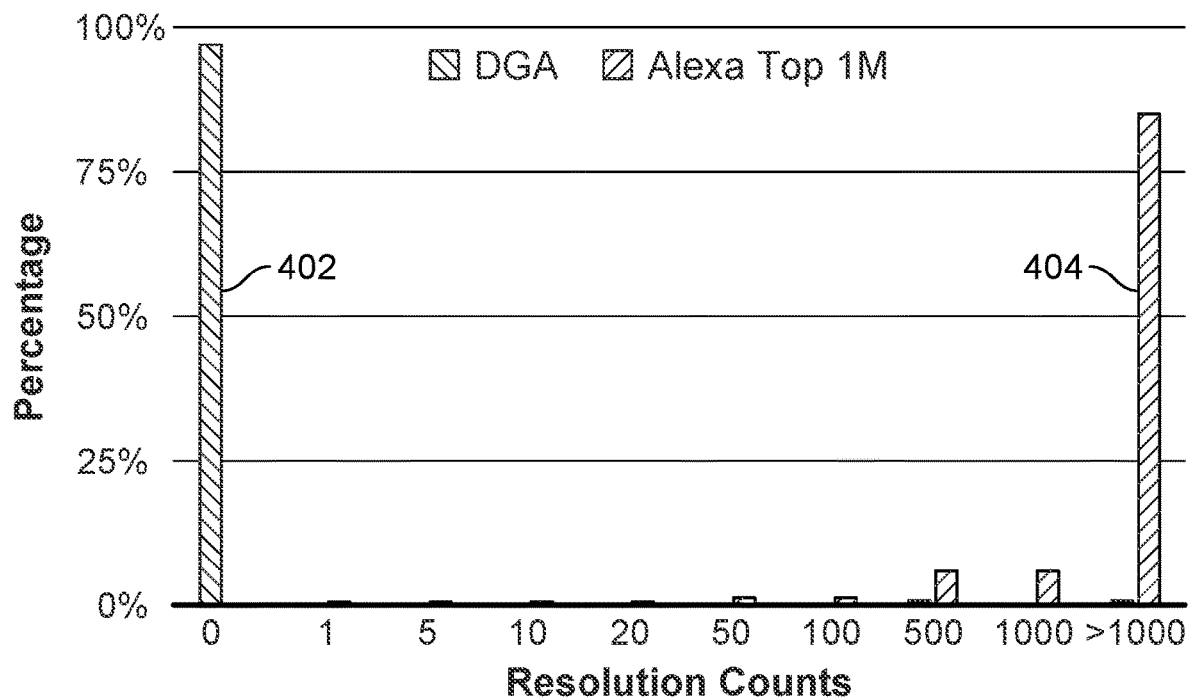
FIG. 4A illustrates examples of differences between resolution counts of algorithmically generated domains and benign domains.
Figure 4B:
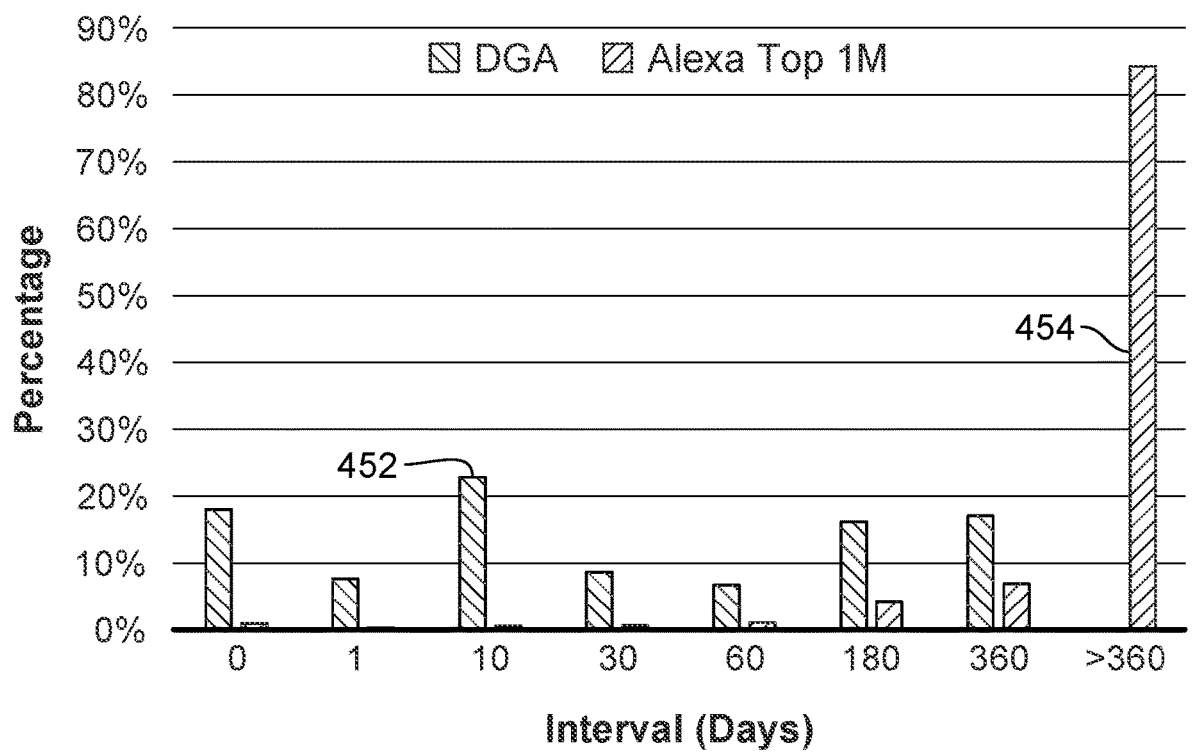
FIG. 4B illustrates examples of differences between resolution intervals of algorithmically generated domains and benign domains.

In various embodiments, prior to returning a verdict of "AGD" in response to a query, AGD detector 138 evaluates historical information associated with the domain. As illustrated in FIGS. 4A and 4B, AGD and benign sites generally exhibit very different resolution statistics. For example, a given AGD will have very few (if any) successful resolutions (402) whereas a benign site, and in particular a popular site will have many resolutions (404). Further, the length of time between when an AGD is first resolved and was last resolved will typically be much shorter (452) than that of a benign domain (454). Such historical information can be used by AGD detector 138 to reduce false positives. As an example, when a domain is determined (by Markov Chain analyzer 144) to be an AGD, domain history checker 146 queries database 160 for resolution information associated with the domain. A final verdict for the domain can be determined by decision engine 152, using thresholds. As an example, suppose a given domain had a Markov Chain analysis score of −0.48. Such a score (below the threshold of −0.44) would cause Markov Chain analyzer 144 to flag the domain as an AGD. If the resolution count of the domain is above a given threshold (e.g., 20 or more resolutions) or the interval is above a given threshold (e.g., 1 year), the verdict of AGD can be overridden as a false positive.

C. Example Process

Figure 5:
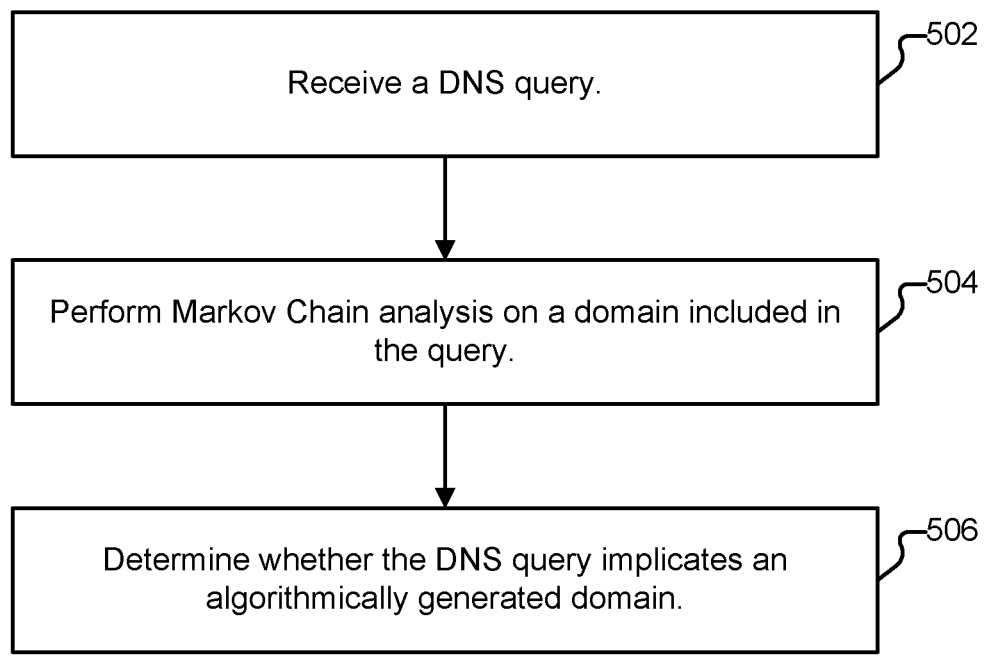
FIG. 5 illustrates an example of a process for detecting algorithmically generated domains.

FIG. 5 illustrates an example of a process for detecting algorithmically generated domains. In various embodiments, process 500 is performed by security platform 140. Process 500 can also be performed by other types of platforms/devices, as applicable, such as data appliance 102, client device 104, etc. Process 500 begins at 502 when a DNS query is received. As one example, a DNS query is received at 502 by frontend 142 when DNS module 134 receives (whether actively or passively) a DNS resolution request from client device 104. In some embodiments, DNS module 134 provides all DNS resolution requests as queries to platform 140 for analysis. DNS module 134 can also more selectively provide such requests to platform 140. One example reason DNS module 134 might not query platform 140 for a domain is where information associated with the domain is cached in data appliance 102 (e.g., because client device 106 previously requested resolution of the domain and process 500 was previously performed with respect to the domain). Another example reason is that the domain is on a whitelist/blacklist/etc., and so additional processing is not needed.

At 504, Markov Chain analysis is performed on the domain received at 502. One example way to perform such analysis is using a Markov Chain analyzer (144) authored in Go or another appropriate language. As discussed above, a Markov Chain model can be generated for use by Markov Chain analyzer 144 using training sets comprising known benign and known algorithmically generated domains.

At 506, a determination of whether the domain received at 502 implicates an algorithmically generated domain is made. As one example, decision engine 152 (authored in Go or another appropriate language) can return a "benign" verdict if Markov Chain analyzer 144 has determined (e.g., do to comparison of a score against a threshold) that the domain was not algorithmically generated. As discussed above, one potential drawback of exclusively using Markov Chain analyzer 144 for verdicts is that false positives can occur. In various embodiments, decision engine 152 also considers additional information before returning an AGD result. For example, decision engine 152 can apply a threshold to historical information stored in database 160 and retrieved by domain history checker 146 (also authored in Go or another appropriate language). An example of database 160 is a Redis database, and example information included in database 160 is each date/timestamp a request for a given domain was made, and whether resolution was successful (or other appropriate information such as the resolved IP address of the domain). The historical information stored in database can be collected by security platform 140 (e.g., by collecting information from each of data appliances 102, 136, and 148 about resolution requests made by clients inside their respective networks 110, 114, and 116). The historical information stored in database can also at least partially be supplied by one or more third parties (e.g., provided by DNS server 124) as applicable.

A variety of actions can be taken in response to decision engine 152 determining that a domain is algorithmically generated. As one example, security platform 140 can respond to data appliance 102 with an appropriate result (e.g., a verdict of "AGD"). Data appliance can then take actions based on policies 252 such as preventing communications between the client device (e.g., client device 104) and the AGD. Data appliance 102 can also take other actions, such as alerting an administrator that a given client device has attempted to contact an AGD (and thus may be compromised/having malware executing on it), quarantining the client device from other nodes on network 110, etc.).

Security platform 140 can also take additional actions in response to decision engine 152 determining that a domain is algorithmically generated. As one example, security platform 140 can attempt to determine whether the domain belongs to a particular DGA family. This can be helpful in determining, e.g., the nature of malware that has (potentially) compromised client 104. One approach to classifying a given domain into a family is to extract features associated with the domain, and use a machine learning model.

As shown in FIG. 1, security platform 140 includes a DGA family labeler 156 (authored in python or another appropriate language). DGA family labeler 156 makes use of a random forest model 158 that was trained using information from a set of known DGA families. Examples of such features include what the TLD of the domain is (e.g., ".com" vs. ".so"), the number of occurrences of particular characters in the domain (e.g., the number of times "–" is used), the length of the domain, the number of distinct characters in the domain, the ratio of digits to non digits in the domain, whether the first character of the root domain is a digit, etc. Such features can be extracted by feature extractor 156 (authored in python or another appropriate language). Other approaches can also be used, such as by applying heuristics, or using other types of machine learning models such as support vector machines, as applicable.

If the random forest model indicates a match between the domain and a known family, the domain can be associated with the family (e.g., as information stored in database 160) and other appropriate actions can be taken (e.g., alerting an administrator that client device 104 was seen exhibiting behavior associated with the particular family).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, at a first node, a DNS query in response to a client device making a DNS resolution request;
determine whether the received DNS query implicates an algorithmically generated domain (AGD) based at least in part by performing Markov Chain analysis on a domain included in the received DNS query; and
include, by the first node, in a response to the received DNS query, an indication that the DNS resolution request made by the client device is indicative of the client device engaging in AGD activity;
wherein the indication included in the response to the received DNS query is usable by a security appliance to at least partially remediate the client device; and a memory coupled to the processor and configured to provide the processor with instructions.

2. The system of claim 1, wherein determining whether the received DNS query implicates the algorithmically generated domain includes evaluating historical resolution information.

3. The system of claim 2, wherein the historical resolution information comprises a count of resolutions.

4. The system of claim 2, wherein the historical resolution information comprises an interval between a first resolution and a last resolution.

5. The system of claim 1, wherein performing the Markov Chain analysis includes using a model trained at least in part using a set of known algorithmically generated domains.

6. The system of claim 1, wherein performing the Markov Chain analysis includes using a model trained at least in part using a set of known benign domains.

7. The system of claim 1, wherein determining whether the received DNS query implicates the AGD includes using a random forest trained using features extracted from a plurality of other AGDs.

8. The system of claim 7, wherein at least one feature comprises a domain suffix.

9. The system of claim 7, wherein at least one feature comprises a count of hyphens.

10. The system of claim 7, wherein at least one feature comprises a domain length.

11. The system of claim 7, wherein at least one feature comprises a distinct number of characters.

12. The system of claim 7, wherein at least one feature comprises a ratio of digits to other characters.

13. The system of claim 7, wherein at least one feature comprises whether a first character of a root domain is a digit.

14. A method, comprising:
receiving, at a first node, a DNS query in response to a client device making a DNS resolution request;
determining whether the received DNS query implicates an algorithmically generated domain (AGD) based at least in part by performing Markov Chain analysis on a domain included in the received DNS query; and
including, by the first node, in a response to the received DNS query, an indication that the DNS resolution request made by the client device is indicative of the client device engaging in AGD activity;
wherein the indication included in the response to the received DNS query is usable by a security appliance to at least partially remediate the client device.

15. A computer program product embodied in a tangible computer readable storage medium and comprising computer instructions for:
receiving, at a first node, a DNS query in response to a client device making a DNS resolution request;
determining whether the received DNS query implicates an algorithmically generated domain (AGD) based at least in part by performing Markov Chain analysis on a domain included in the received DNS query; and
including, by the first node, in a response to the received DNS query, an indication that the DNS resolution request made by the client device is indicative of the client device engaging in AGD activity;
wherein the indication included in the response to the received DNS query is usable by a security appliance to at least partially remediate the client device.

16. The system of claim 1, wherein the security appliance is configured to alert an administrator that the client device is engaging in AGD activity.

17. The system of claim 1, wherein the security appliance is configured to quarantine the client device.

18. The system of claim 1, wherein the security appliance is configured to prevent communications between the client device and the AGD.

19. The method of claim 14, wherein determining whether the received DNS query implicates the algorithmically generated domain includes evaluating historical resolution information.

20. The method of claim 19, wherein the historical resolution information comprises a count of resolutions.

21. The method of claim 19, wherein the historical resolution information comprises an interval between a first resolution and a last resolution.

22. The method of claim 14, wherein performing the Markov Chain analysis includes using a model trained at least in part using a set of known algorithmically generated domains.

23. The method of claim 14, wherein performing the Markov Chain analysis includes using a model trained at least in part using a set of known benign domains.

24. The method of claim 14, wherein determining whether the received DNS query implicates the AGD includes using a random forest trained using features extracted from a plurality of other AGDs.

25. The method of claim 24, wherein at least one feature comprises a domain suffix.

26. The method of claim 24, wherein at least one feature comprises a count of hyphens.

27. The method of claim 24, wherein at least one feature comprises a domain length.

28. The method of claim 24, wherein at least one feature comprises a distinct number of characters.

29. The method of claim 24, wherein at least one feature comprises a ratio of digits to other characters.

30. The method of claim 24, wherein at least one feature comprises whether a first character of a root domain is a digit.

* * * * *